(12) United States Patent
Vogel et al.

(10) Patent No.: US 8,664,564 B2
(45) Date of Patent: Mar. 4, 2014

(54) CONTROLLED HARMONICS POWER SUPPLY FOR WELDING-TYPE SYSTEM

(75) Inventors: Bernard J. Vogel, Troy, OH (US);
Michael D. Madsen, Fremont, WI (US);
Todd G. Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1632 days.

(21) Appl. No.: 11/744,533

(22) Filed: May 4, 2007

(65) Prior Publication Data

US 2008/0272099 A1 Nov. 6, 2008

(51) Int. Cl.
*B23K 9/10* (2006.01)

(52) U.S. Cl.
USPC ...................................... 219/130.1

(58) Field of Classification Search
USPC ...................................... 219/130.1
See application file for complete search history.

(56) References Cited

U.S. PATENT DOCUMENTS

| | | | |
|---|---|---|---|
| 5,748,462 A * | 5/1998 | Moro et al. | 363/97 |
| 6,040,555 A | 3/2000 | Tiller et al. | |
| 6,972,534 B1 | 12/2005 | Schulz | |
| 7,049,545 B2 | 5/2006 | Matus et al. | |
| 2003/0002299 A1 | 1/2003 | Trzynadlowski | |
| 2004/0016724 A1 * | 1/2004 | Geissler | 219/121.36 |
| 2004/0217097 A1 * | 11/2004 | Bunker | 219/130.1 |
| 2004/0217748 A1 | 11/2004 | Andrews | |
| 2006/0050831 A1 | 3/2006 | Schulz | |

FOREIGN PATENT DOCUMENTS

CN 1150076 5/1997

OTHER PUBLICATIONS

Andrzej M. Trzynadlowski, Konstantin Borisov, Yuan Li, and Ling Qin, "A Novel Random PWM Technique with Minimum Computational Overhead and Constant Sampling Frequency for High-Volume, Low-Cost Applications", Applied Power Electronics Conference and Exposition, 2004. Nineteenth Annual IEE Anaheim, CA Feb. 22-26, 2004, Picscatway, NJ, IEEE, vol. 1, Feb. 22, 2004, pp. 473-478.

Y. Shrivastva, S. Sathiakumar and S.Y.R. Hui, "Random Discrete PWM method for DC-DC Power Converters", Electronics Letters, Nov. 7, 1996, IEE Stevenage, GB, vol. 32, No. 23, Nov. 7, 1996, pp. 2105-2106.

International Search Report—Results Pages, mailed Jul. 31, 2008.

* cited by examiner

*Primary Examiner* — Brian Jennison
(74) *Attorney, Agent, or Firm* — Quarles & Brady, LLP

(57) ABSTRACT

A system and method for operating an inverted-based power source includes a power input configured to receive alternating current (AC) power and a rectifier configured to convert the AC power to direct current (DC) power. The inverter-based power source also includes an inverter configured to receive the DC power from the rectifier and convert the DC power to AC power and a controller configured to generate switching signals according to a pattern of offsets from a regular half period and communicate the switching signals to the inverter or rectifier control operation of the inverter or rectifier.

19 Claims, 4 Drawing Sheets

US 8,664,564 B2

CONTROLLED HARMONICS POWER SUPPLY FOR WELDING-TYPE SYSTEM

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to a welding-type system and, more particularly, to a system and method for controlling the harmonics injected onto an input power line during the operation of a welding-type system.

Welding-type systems, such as welders, plasma cutters, and induction heaters, often include an inverter-based power source that is designed to condition high power to carrying out a desired process. These inverter-based power sources, often referred to as switched-mode power supplies, can take many forms. For example, they may include a half-bridge inverter topology, a full-bridge inverter topology, a forward-converter topology, a flyback topology, a boost-converter topology, a buck-converter topology, and combinations thereof.

Regardless of the specific inverter topology employed, referring to FIG. 1, an inverter-based power source systems 10 typically includes a variety of components, such as an input filter 12, first rectifier 14, an inverter 16, an analog controller 18, and a second rectifier 20 that is connected to an output 22. While FIG. 1 is a simplified overview of common components of an inverter-based power source system 10, it is contemplated that additional components may be included, such as filtering components, feedback and control loops, and transformers or other converters designed to provide a desired output power characteristic.

During operation, the system 10 is connected to a supply of power 24 that provides alternating-current (AC) power, for example, as received from a utility grid over transmission power lines 26. The rectifier 12 is designed to receive the AC power from the supply of power 24 and convert the AC power to DC power that is delivered to a DC bus 28. Specifically, the rectifier 20 includes a plurality of switches that rectify the AC power received from the supply of power 24.

The DC power is delivered from the rectifier 12 over the DC bus 28 to the inverter 16. The inverter 16 includes a plurality of switching devices (e.g., IGBTs or other semiconductor switches) that are positioned between the positive and negative buses 28. The inverter 16 is controlled by the analog controller 18 to open and close specific combinations of the switches to sequentially generate pulses that are delivered to the second rectifier 20 and, ultimately, to the output 22 with the desired voltage and current characteristics. Specifically, the above-described inverter-based power source system 10 is specifically designed for delivering high-power to the output 22 to drive a process such as welding, plasma cutting, and induction heating.

As described, inverter-based power sources include at least one active switching device, the inverter 16. The switching characteristics of the inverter 16 are controlled by the analog controller 18 to, along with the second rectifier 20, produce the desired output power having the desired voltage and current characteristics.

Specifically, referring now to FIG. 2, the components of a half-bridge inverter and associated analog controller are shown. However, as addressed above, it is contemplated that additional topologies, such as a full-bridge inverter topology, a forward-converter topology, a flyback topology, a boost-converter topology, a buck-converter topology, and combinations thereof, may be employed. Furthermore, it is contemplated that additional components, such as transformers and various power conditioning components, are typically employed but have not been shown in order to simply the illustrated inverter configuration.

The analog controller 18 typically includes a waveform generator 30 and a comparator 32. The waveform generator 30 generates a carrier signal or waveform having a first frequency and a first period that is passed to the comparator 32 to be compared to a sinusoidal command or modulating voltage waveform having a second, typically lower, frequency and a second, typically longer, period. Responsive thereto, the comparator 32 generates a first trigger signal and a second trigger signal corresponding to a comparison and identification of intersections of the command waveform and carrier waveform. The first trigger signal is provided to a first or "upper" switch 34 of the inverter 16 and the second trigger signal is provided to a second or "lower" switch 36 of the inverter 16. In this regard, the switches 34, 36 of the inverter 16 are caused to open and close in alternating fashion to generate a high-frequency AC signal that is provided to the rectifier 20 to produce the desired output power.

Therefore, the comparator 32 generally functions by comparing a time varying analog signal to a ramp type signal, to generate timing pulses to the switches 34, 36 of fixed frequency but with variable pulse width or "ON" time. In this regard, the comparator 32 controls the pulse width modulation (PWM) or the ON/OFF ratio of the switches 34, 36 to effectively control the output voltage and/or current as required by a feedback control loop and a commanded output level.

Unfortunately, the operation of active switching devices, such as the inverter 16, can inject high-frequency harmonics onto the power lines 26. These injected harmonics can adversely affect operation of other systems connected to the supply of power 24. Additionally, the rectifiers 14, 20 may be actively controlled as well and may, likewise, inject harmonics onto the power lines 26.

As a result, one or more filters 12 are often arranged between the supply of power 24 and the inverter-based power source 10. For example, the filter 12 may include passive filter components designed to suppress the harmonics injected onto the power lines 26 by operation of the inverter-based power source 10.

However, as power regulations become more and more stringent, the amount of high-frequency harmonics tolerated under the regulations decrease. Furthermore, since these regulations vary between countries, the amount and concentration of harmonics tolerated under such regulations varies by country.

Therefore, it would be desirable to have a system and method for accurately controlling the harmonics injected onto power supply lines during the operation of welding-type systems.

BRIEF SUMMARY OF THE INVENTION

The present invention overcomes the aforementioned drawbacks by providing a system and method for controlling the half period and frequency of switching signals generated by an actively controlled switching device in an inverter-based power source. Specifically, the present invention is designed to control the amplitude of harmonic peaks injected onto an input power line by an inverter-based, welding-type device employing a digital control system.

In accordance with one aspect of the present invention, an inverter-based power source is disclosed that includes a power input configured to receive alternating current (AC) power, and a rectifier configured to convert the AC power to direct current (DC) power. The inverter-based power source also includes an inverter configured to receive the DC power from the rectifier and convert the DC power to AC power and a controller configured to generate switching signals according to a pattern of offsets from a regular half period and communicate the switching signals to the inverter or rectifier control operation of the inverter or rectifier.

In accordance with another aspect of the present invention, an inverter-based power source is disclosed that includes a power input configured to receive AC power, a rectifier configured to convert the AC power to DC power, and an inverter having a plurality of switches configured to receive the DC power from the rectifier and convert the DC power to AC power. The inverter-based power source also includes a clock configured to generate a clock signal having a regular frequency and a set of programmable logic configured to receive the clock signal and generate a series of control signals based on the clock signal configured to cause the plurality of switches to switch at an irregular frequency.

In accordance with yet another aspect of the present invention, a welding-type device is disclosed that includes a power input configured to receive AC power, a first rectifier configured to convert the AC power to DC power, and an inverter configured to receive the DC power from the rectifier. The welding-type device also includes a digital controller configured to generate switching signals according to a pattern of offsets from a regular half period and communicate the switching signals the inverter to control the inverter to convert the DC power to AC power and a second rectifier configured to receive the AC power from the inverter and convert the AC power to a welding-type power.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
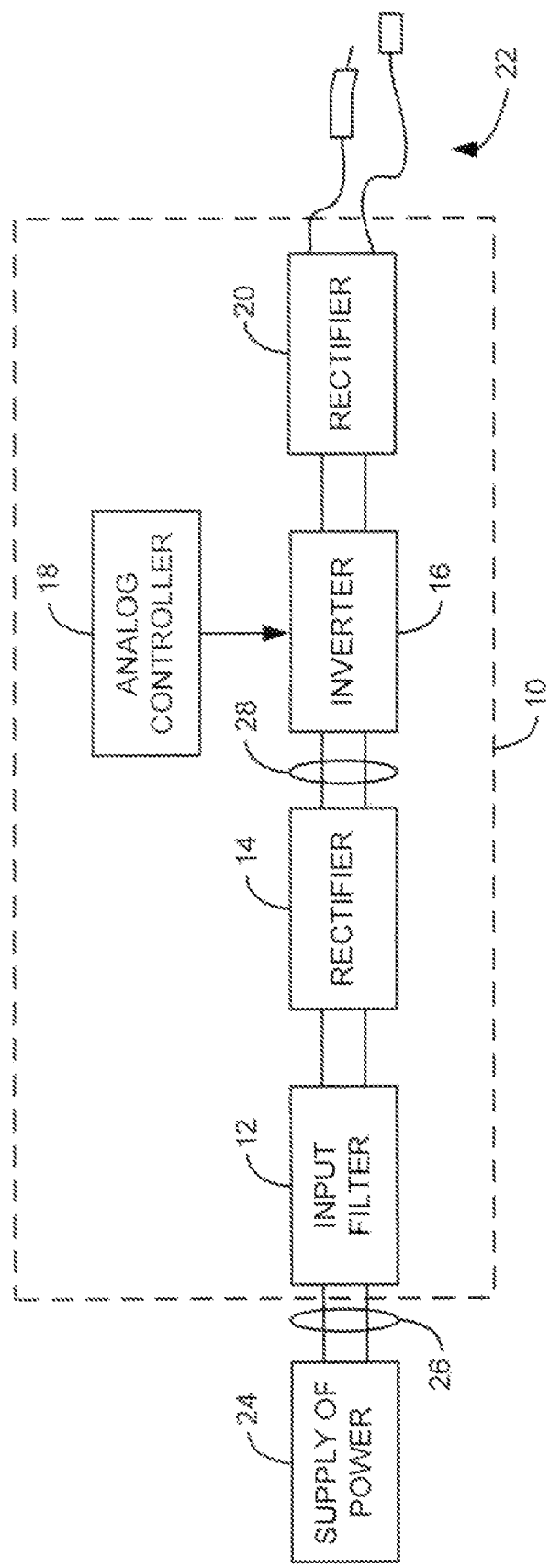
FIG. 1 is a schematic illustration of an inverter-based power source of a welding-type device and associated connections.
Figure 2:
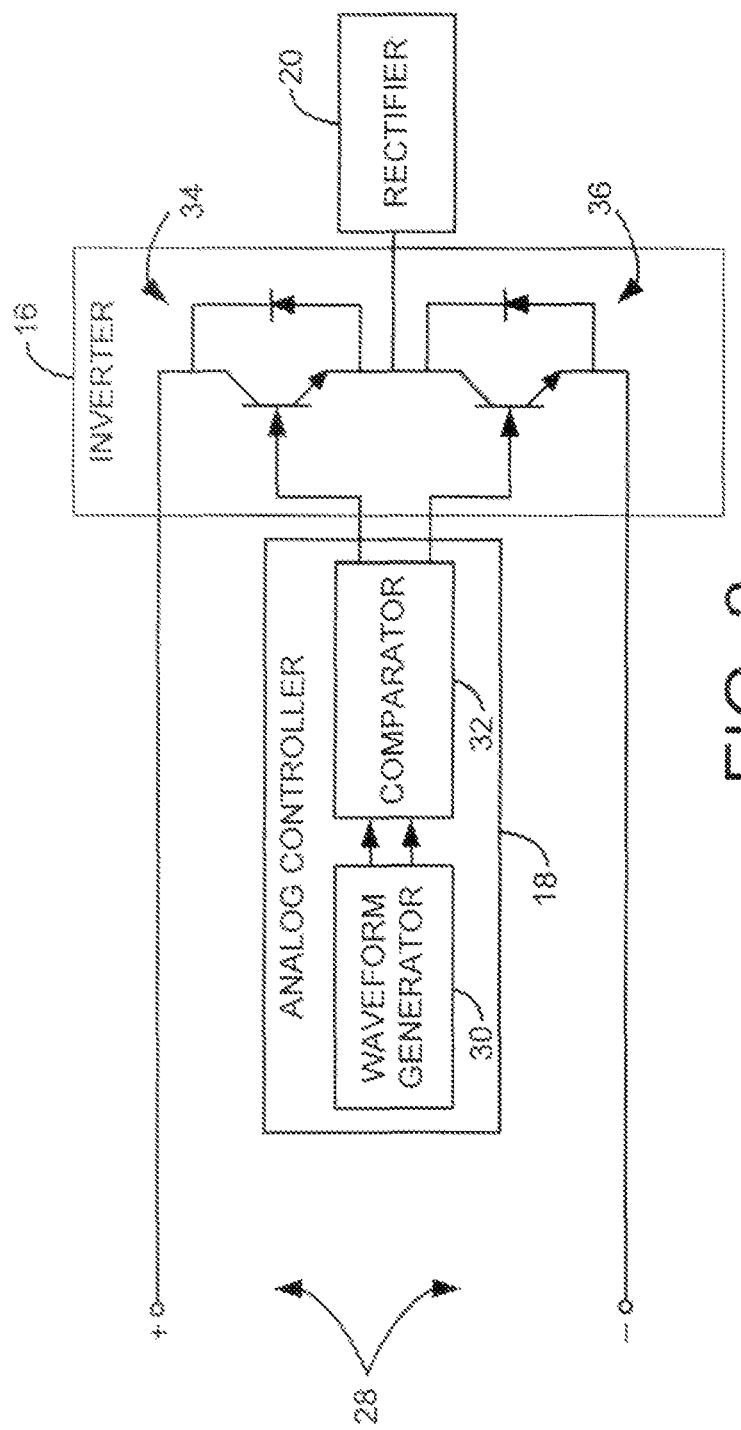
FIG. 2 is a schematic illustration of the inverter and analog controller of FIG. 1.
Figure 3:
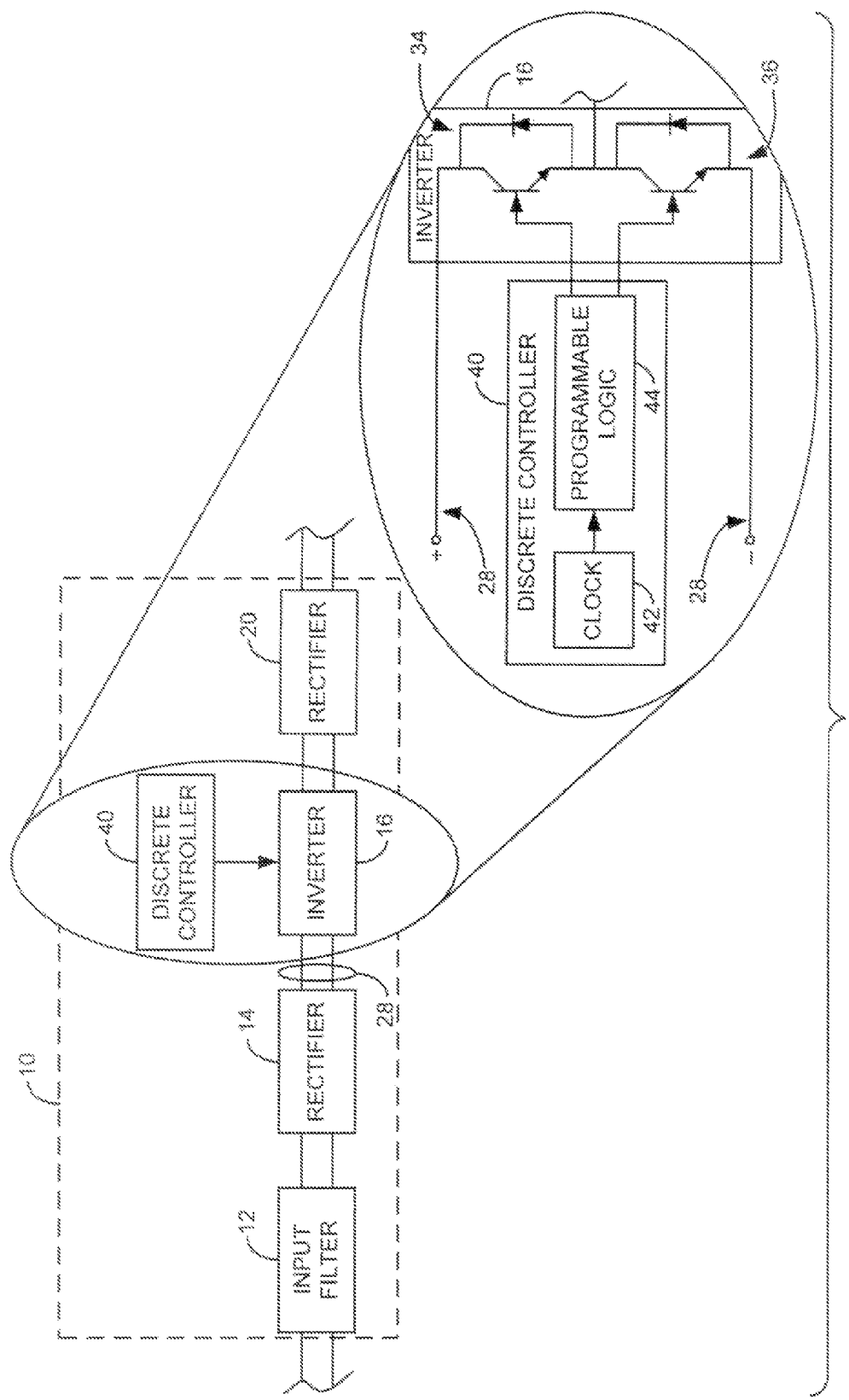
FIG. 3 is a schematic illustration of an inverter-based power source of a welding-type device including an inverter and discrete controller in accordance with the present invention.

Referring now to FIG. 3, the analog controller 18 of FIGS. 1 and 2 have been replaced with a discrete, programmable controller 40. Again, the components of a half-bridge inverter and associated analog controller are shown. However, as addressed above, it is contemplated that additional topologies, such as a full-bridge inverter topology, a forward-converter topology, a flyback topology, a boost-converter topology, a buck-converter topology, and combinations thereof, may be employed. Furthermore, it is contemplated that additional components, such as transformers and various power conditioning components, are typically employed but have not been shown in order to simply the illustrated inverter configuration. Furthermore, although explanation of the present invention will be made with respect to controlling the switching of an inverter, it is contemplated that the present invention is equally applicable to actively controlling other switching devices other than inverters. For example, as will be described, the present invention is equivalently applicable to controlling operation of active rectifiers, boost and/or buck converters, and the like.

The programmable controller 40 includes a clock 42 and a set of programmable logic 44. In accordance with one embodiment, the programmable logic 44 includes a field-programmable gate array (FPGA), but may include a wide variety of other programmable logic systems.

The clock 42 is configured to generate a regular, periodic clock signal that is delivered to the programmable logic 44. For example, in accordance with one embodiment, the clock 42 may generate a clock signal having a period of 12.5 nanoseconds (ns). The programmable logic 44 receives the clock signal and, in a manner similar to the above-described analog controller 18, generates alternating switching signals to the first switch 34 and the second switch 36 to convert the DC power received from the rectifier 14 to AC power. However, unlike the above-described analog controller 18, the discrete controller 40 is designed for extremely accurate switching frequency control.

Specifically, the discrete controller 40 is inherently capable of generating the alternating switching signals with a very high degree of precision and repeatability that an analog controller 18 is incapable of achieving. While this high degree of precision is generally advantageous, the highly periodic switching of the switches 34, 36 results in precise alignment of harmonics associated with the fundamental switching frequency that can stretch well into the megahertz (MHz) range.

Figure 4:
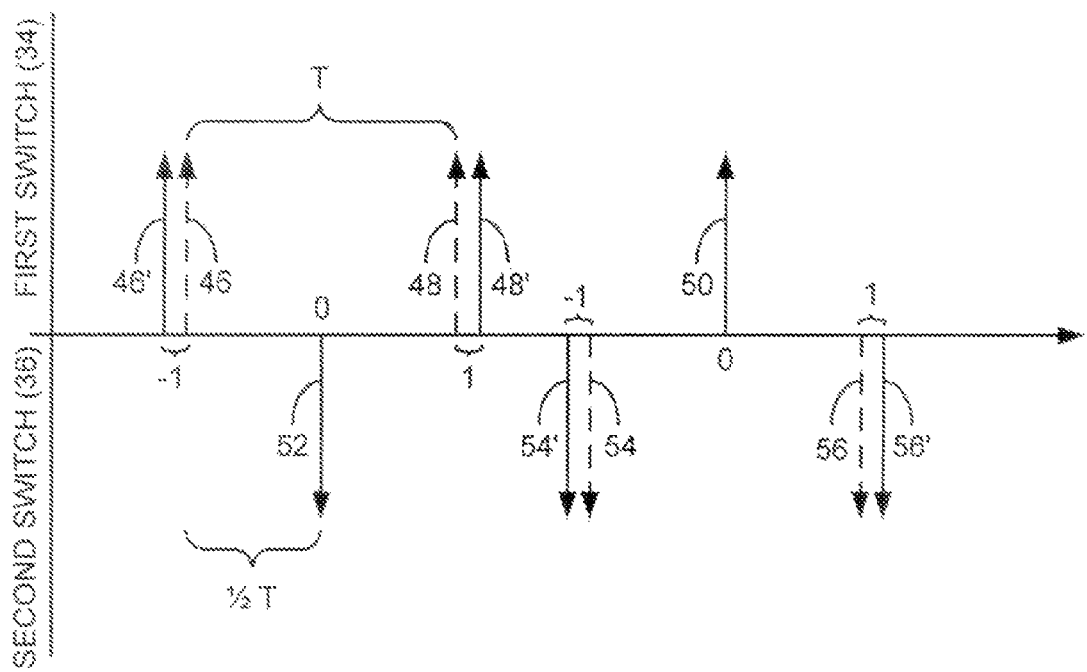
FIG. 4 is a schematic illustration of a switching control algorithm in accordance with the present invention.

Referring now to FIGS. 3 and 4, the present invention provides a system and method for controlling the harmonics associated with the fundamental switching frequency of an inverter-based power source 10 employing a discrete controller 40. Specifically, as illustrated in FIG. 4, the discrete controller 40 is configured to generate a series of switching signals that alternate to cause the first switch 34 to switch and then the second switch 36 to switch and so on. In this regard, the switching signals have a period, T, that extends between switching signals for one switch 46, 48, 50 and a half period, ½ T, that extends between the switching signals 46, 48, 50 for the first switch 34 and the switching signals 52, 54, 56 for the second switch 36.

Since these switching signals 46-56 are generated by the programmable logic 44 based on the clock signal received from the clock 42, they have a highly regular period and half period. For example, if the discrete controller 40 is selected to operate at a frequency of 40 kilohertz (kHz), the fundamental switching period, T, is 25 microseconds (μs) and the half period, ½ T, is 12.5 μs. Using a clock period of 12.5 ns means that the switching signals 46-56 are generated every 12.5 μs with an accuracy of greater than 12.5 ns. Unfortunately, as addressed above, this high degree of accuracy aligns the harmonics generated by the switching well into the MHz range, for example, at the $428^{th}$ and $636^{th}$ harmonic of the base frequency of 40 kHz.

To overcome this concentration of harmonics, the present invention introduces a dither or offset into the each half period. Specifically, the programmable logic 44 is configured to include a pattern of offsets from the regular half-period calculation for generating the switching signals 46-56. When creating a pattern of offsets or algorithm for generating the offsets, the offset selection must be selected to avoid introducing a long-term DC component into the primary switching waveform that would cause transformer saturation. As will be described, to do so, the offset pattern includes an odd number of offsets or steps. Additionally, when creating a pattern of offsets or algorithm for generating the offsets, the offset selection must be selected to avoid introducing an audible tone in the open arc generated by the inverter-based power source 10, such as when using the inverter-based power source to perform a welding process. As will be shown below, to do so, the offset pattern is asymmetric. However, in some cases, it is contemplated the offset pattern may be symmetric. For example, when employing an operational frequency significantly greater than 40 kHz, such as 100 kHz, a symmetric offset pattern may be utilized without inducing substantial audible tones in the output power.

Referring to FIG. 4, a three-step, asymmetric, offset pattern is utilized to shift the switching signals 46-56. Specifically, the three-step, asymmetric, offset pattern takes the form of a −1, 0, 1 pattern. That is, the first switching signal 46 is shifted back by one clock signal, in this example, 12.5 ns, represented by 46'. Following the three-step, asymmetric, offset pattern of −1, 0, 1, the next switching signal 52 is shifted by an offset of 0, and, therefore, remains unchanged. The following switching signal 48 is shifted forward by an offset of 1, represented by 48'. Thereafter, the −1, 0, 1 pattern repeats asymmetrically, such that the following switching signal 54 is shifted back by one clock signal, represented by 54'. The next switching signal 50 remains unchanged and the following switching signal 56 is shifted forward by one clock signal, represented by 56'.

The shift of one clock signal (i.e., 12.5 ns) when using a half period of 12.5 μs is nominal. However, it is sufficient to spread the spectrum of harmonics and avoid the focusing of harmonics to create a highly pronounced peak. Furthermore, using an asymmetric offset pattern (e.g., −1, 0, 1, −1, 0, 1) as opposed to a symmetrical offset pattern (e.g., −1, 0, 1, 0, −1) causes a higher "ripple" frequency that is less likely to result in a sub-harmonic tone appearing in the output power signal, for example, in a welding arc generated by the inverter-based power source 10.

Figure 5:
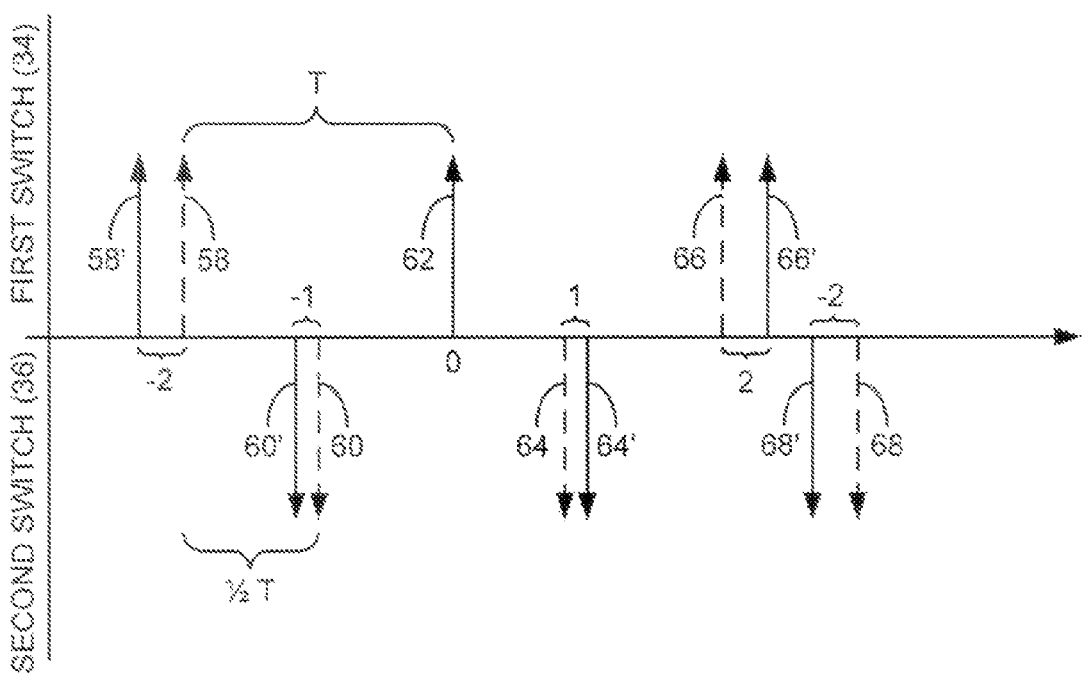
FIG. 5 is a schematic illustration of another switching control algorithm in accordance with the present invention.

Referring now to FIG. 5, it is contemplated that other offset patterns may be employed. Specifically, FIG. 5 illustrates the switching signals for a five-step, asymmetric offset sequence of −2, −1, 0, 1, 2, −2, and so on. In this case, a first switching signal 58 is shifted back two clock signals (58'), a second switching signal 60 is shifted back one clock signal (60'), a third switching signal 62 is not shifted, a fourth switching signal 64 is shifted forward by one clock signal (64'), a fifth switching signal 66 is shifted forward by two clock signals (66'), a sixth switching signal 68 is back two clock signals (68'), and so on.

While both the three-step, asymmetric offset pattern of FIG. 4 and the five-step, asymmetric offset pattern of FIG. 5 are suitable, in some cases, the five-step, asymmetric offset pattern of FIG. 5 is more effective at distributing the harmonics. Furthermore, while three- and five-step offset patterns were described above, it is contemplated that more than five steps may be utilized. Additionally, while a base offset size of one clock signal is used in both of the above examples, it is contemplated that larger base offsets of multiple clock signals may be utilized. Further still, it is contemplated that the modulation or offset may be selected not based on steps formed by the clock signal but based on steps formed as a percentage of the switching frequency. As described above, the modulation of the fundamental switching frequency may follow a pattern, for example, a linear pattern or the asymmetric pattern. However, it is contemplated that the modulation of the switching frequency may be randomized.

Though the present invention has been described with respect to a controlling a half-bridge inverter, it is contemplated that the present invention is applicable to controlling other inverter topologies and/or components other than the inverter. For example, it is contemplated that additional inverter topologies, such as a full-bridge inverter topology, a forward-converter topology, a flyback topology, a boost-converter topology, a buck-converter topology, and the like, may be controlled using the above-described invention to control the harmonics injected by the active switching of such devices. Additionally, while the above-described system and method is effective at controlling injected harmonics attributed to inverter switching, it is contemplated that these systems and methods may also be applied to rectifier switching to control the concentration of harmonics associated with the fundamental switching frequency of an actively controlled rectifier.

Similarly, referring again to FIG. 3, many inverter-based welding-type power sources include an additional power processing stage located between the rectifier 14 and the inverter 16. This additional power processing stage is typically referred to a "preregulator," and is usually implemented as a boost converter. Similar to the inverter 14, the boost converter has an active switch that is controlled by the controller 40 or another controller. It is contemplated that the boost converter could be operated in a fixed-frequency modulation mode. In this case, the above-described dithering techniques can be utilized to reduce harmonics injected by the operation of the boost converter of the preregulator or other similar system. In addition, it is contemplated that the above-described systems and methods may be combined with traditional filtering, grounding, loop minimization, and other harmonic control techniques.

Therefore, the above-described system and method is capable of controlling the half period and frequency of switching signals generated by an actively controlled switching device in an inverter-based power source. A pattern of offsets from a regular half period is used to switch the actively controlled switching device at an irregular frequency. The pattern of offsets is selected to unfocus harmonics injected at the power input due to switching the actively controlled switching device and generate an output power signal substantially free of audible tones. As such, the present invention is designed to control the amplitude of harmonic peaks injected onto an input power line by an inverter-based welding-type device employing a digital control system.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. An inverter-based power source configured to drive a welding-type system comprising:

a power input configured to receive alternating current (AC) power;

a first rectifier configured to convert the AC power to direct current (DC) power;

an inverter configured to receive the DC power from the rectifier and convert the DC power to AC power;

a controller configured to generate switching signals according to a pattern of offsets from a regular half period and communicate the switching signals to one of the inverter and the rectifier to control operation of the one of the inverter and the rectifier; and a second rectifier configured to receive the AC power from the inverter and convert the AC power to a welding-type power.

2. The inverter-based power source of claim 1 wherein the pattern of offsets is selected to unfocus harmonics injected at the power input due to switching the one of the inverter and the rectifier and generate an output power signal free of audible tones.

3. The inverter-based power source of claim 1 wherein the controller includes a clock configured to generate a continuous series of clock signals and a programmable logic configured to receive the clock signal and wherein the offsets in the pattern of offsets are based on the continuous series of clock signals.

4. The inverter-based power source of claim 3 wherein the pattern of offsets includes a positive shift of at least one clock signal in the continuous series of clock signals.

5. The inverter-based power source of claim 3 wherein the pattern of offsets includes a negative shift of at least one clock signal in the continuous series of clock signals.

6. The inverter-based power source of claim 3 wherein the pattern of offsets includes a negative shift of one clock signal, no shift, and a positive shift of one clock signal.

7. The inverter-based power source of claim 3 wherein the pattern of offsets includes a negative shift of two clock signals, a negative shift of one clock signal, no shift, a positive shift of one clock signal, and a positive shift of two clock signals.

8. The inverter-based power source of claim 1 wherein the pattern of offsets is asymmetric.

9. The inverter-based power source of claim 1 wherein the pattern of offsets includes positive and negative offsets.

10. The inverter-based power source of claim 1 wherein the controller includes a field programmable gate array.

11. The inverter-based power source of claim 1 wherein the welding-type power is configured to drive at least one of a welding process, plasma cutting process, and induction heating process.

12. An inverter-based power source configured to power a welding-type process comprising:

a power input configured to receive AC power;

a first rectifier configured to convert the AC power to DC power;

an inverter having a plurality of switches configured to receive the DC power from the rectifier and convert the DC power to AC power;

a clock configured to generate a clock signal having a regular frequency; and a set of programmable logic configured to receive the clock signal and generate a series of control signals based on the clock signal configured to cause the plurality of switches to switch at an irregular frequency;

a second rectifier configured to receive the AC power from the inverter and convert the AC power to a welding-type power; and wherein the set of programmable logic is configured to generate the control signals according to a pattern of offsets having an odd number of steps.

13. The inverter-based power source of claim 12 wherein the pattern of offsets is selected to unfocus harmonics injected at the power input due to switching the one of the inverter and the rectifier and generate an output power signal free of audible tones.

14. The inverter-based power source of claim 12 wherein the pattern of offsets includes a positive shift of the clock signal.

15. The inverter-based power source of claim 12 wherein the pattern of offsets includes a negative shift of the clock signal.

16. The inverter-based power source of claim 12 wherein the pattern of offsets is asymmetric.

17. The inverter-based power source of claim 12 wherein the pattern of offsets includes positive and negative offsets.

18. The inverter-based power source of claim 12 wherein the programmable logic includes a field programmable gate array.

19. The inverter-based power source of claim 12 wherein the welding-type power is configured to drive at least one of a welding process, plasma cutting process, and induction heating process.

* * * * *

UNITED STATES PATENT AND TRADEMARK OFFICE
CERTIFICATE OF CORRECTION

| | |
|---|---|
| PATENT NO. | : 8,664,564 B2 |
| APPLICATION NO. | : 11/744533 |
| DATED | : March 4, 2014 |
| INVENTOR(S) | : Vogel |

It is certified that error appears in the above-identified patent and that said Letters Patent is hereby corrected as shown below:

On the title page, item [57] line 1 "inverted" should be -- inverter --

Signed and Sealed this
Twenty-seventh Day of May, 2014

Michelle K. Lee
*Deputy Director of the United States Patent and Trademark Office*